Jan. 23, 1968

J. F. FREDA 3,365,024

LUBRICATING EQUIPMENT

Filed July 28, 1964

INVENTOR.
John F. Freda
BY
Synnestvedt & Lechner
ATTORNEYS

Jan. 23, 1968 J. F. FREDA 3,365,024
LUBRICATING EQUIPMENT
Filed July 28, 1964 2 Sheets-Sheet 2

INVENTOR.
John F. Freda
BY
Synnestvedt & Lechner
ATTORNEYS

United States Patent Office 3,365,024
Patented Jan. 23, 1968

3,365,024
LUBRICATING EQUIPMENT
John F. Freda, 594 Division Ave.,
Willow Grove, Pa. 19090
Filed July 28, 1964, Ser. No. 385,621
3 Claims. (Cl. 184—1)

This invention relates to lubricating equipment and in particular relates to a lubricating equipment especially adapted for inserting grease in the races of roller or ball bearing assemblies.

The present invention finds its principal utility in those situations where relatively large numbers of bearings are processed, for example, in garages, service stations, maintenance and overhaul shops for motors, machines, aircraft and the like.

The principal object of the invention is to provide a lubricating device of the kind in question which makes the machine lubrication of bearings a practical reality.

Heretofore there have been several different types of lubricating devices proposed for the machine lubrication of bearings. While most, if not all, of these were capable of inserting grease between the races, none of the same ever came into wide use for the principal reason that they were all highly impractical.

Thus, while the art has long felt the need for machine lubrication, the lack of a practical, operative device has necessitated bearing lubrication to be done by hand. Hand lubrication requires the operator to hold the bearing in one hand while he uses a stick or paddle to insert grease between the races. This method is an anachronism in modern-day industrial practice, particularly when considered in the light of the sophisticated equipment with which bearings are used.

The principal reason for the failure of prior art lubricators to fulfill the need is that they could not fill the bearing race without excessive grease on the equipment and on exterior parts of the bearing. Not only was this wasteful of material, but it required more time to be spent removing excess grease from the bearing assembly and from the lubricating equipment than it would take to insert the grease in the bearing by hand.

To accomplish the principal objective the invention contemplates means which supports the bearing assembly and forms an annular groove, the mouth of which is disposed between the inner and outer races. This groove is in communication with a plurality of passages all leading back to a grease manifold. When grease is injected into the manifold under pressure, it travels up through the passages and thence around the annular groove from whence it moves up through the space between the races. The grease injection is continued until the grease starts to appear on the other side of the race.

With this structure all of the grease is presented to the race from a small ring-like area and when the bearing is removed from its support there is only a negligible minimum of grease that is pulled away with the bearing. The grease in the groove remains intact. Thus there is no cleaning problem either of bearing or equipment.

The preferred structure of the invention will be described below in connection with the following drawings, wherein.

Figure 1:
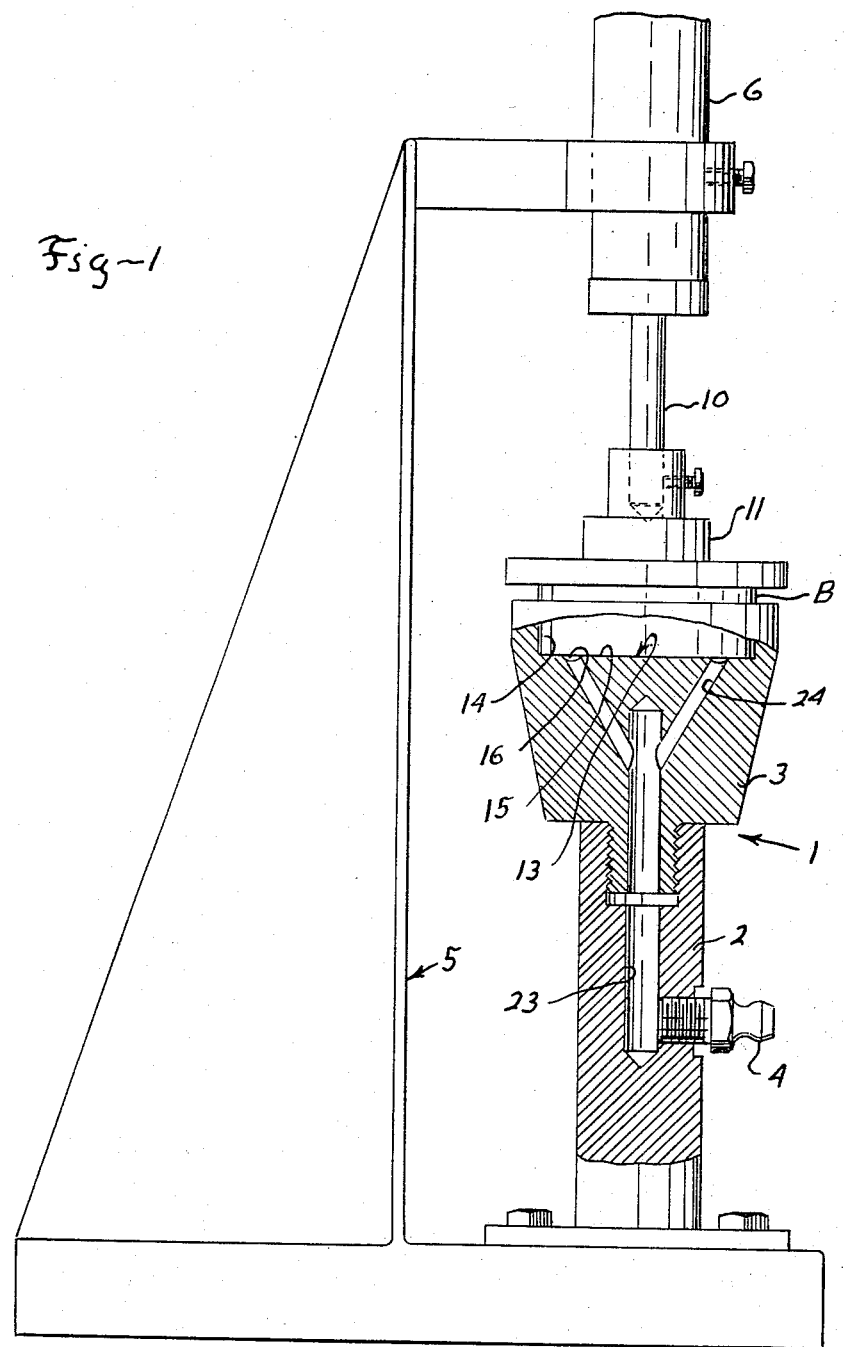
FIGURE 1 is a side elevational view of lubricating apparatus constructed in accordance with the invention.

In FIGURE 1, I have shown a frame 1 which includes a base 2 and a head 3. A grease fitting 4 is connected to the base 2 and is adapted to receive grease from an outside source. A bearing assembly B is supported by the head 3 for a lubricating operation.

Framework 5 supports the base 2 at its lower end and at its upper end supports a piston and cylinder assembly 6. The piston rod 10 removably supports a bearing hold down plate 11 which holds the bearing assembly in the head during a lubricating operation.

The head 3 is formed with a cavity 13 comprising an upstanding annular wall surface 14 and a bottom surface 15. The annular wall surface 14 supports the periphery of the outer race of the bearing assembly B and the surface 15 supports one end of the bearing assembly. On the bottom surface there is formed an annular groove 16.

Figure 2:
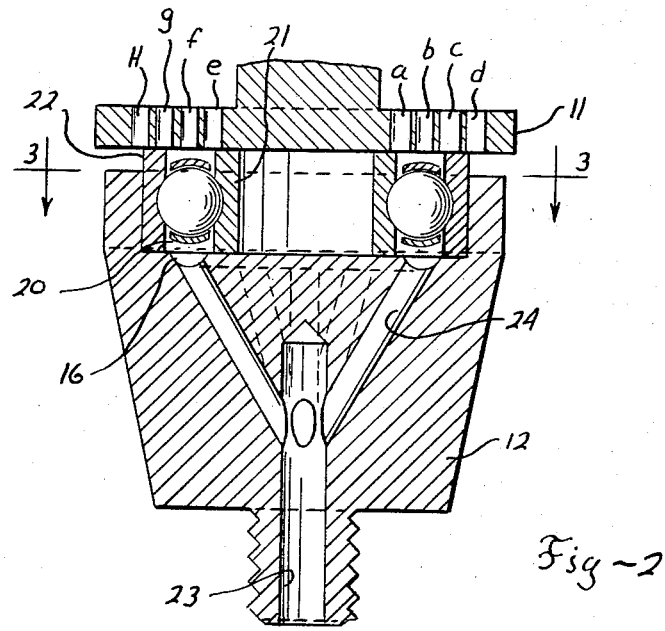
FIGURE 2 is an enlarged fragmentary view of part of the apparatus of FIGURE 1.
Figure 3:
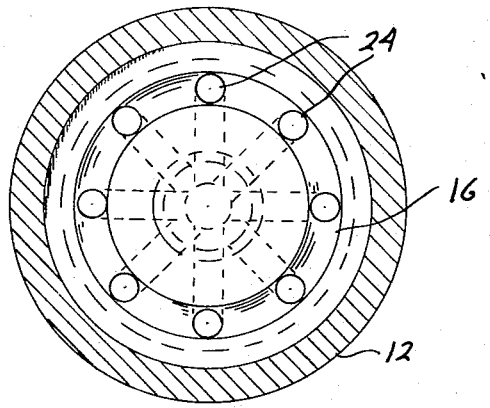
FIGURE 3 is a view taken along the line 3—3 in FIGURE 2.

As will be apparent from an inspection of FIGURE 2 the groove 16 is open to the space 20 between the inner race 21 and the outer race 22 of the bearing B. Both the groove and the upstanding annular wall surface are constructed and disposed so as to bring about the above-mentioned condition. A manner in which groove 16 receives grease will be explained below.

It will be observed that the base and head are bored to form a cylindrical passage 23 which is coaxial with the groove 16. The passage 23 is in communication with the grease fitting 4. The passage 23 constitutes a grease manifold. Within the head 3 there are a plurality of bores forming the passages 24 between the manifold and groove 16. The passages 24 communicate with the groove 16 at equally spaced points. It will be noted that the passages 24 are oriented at an acute angle with respect to the axis of the manifold 23.

When grease under pressure is injected into the manifold, it travels up through the passages 24 and thence spreads around the groove 16. With continued pressure the grease moves up into space 20 between the races. The injection of grease is continued until the space 20 is filled. This is gauged simply by observing the grease as it exits from the top of the space 20.

When a bearing is being relubricated, so to speak, part of the old grease will be forced out by the entry of the new grease. In such instances it is preferred that the injection of the new grease be continued until all the old grease is purged. This latter condition, of course, is determined simply by noting the coloration of the grease exiting from the space between the races.

One of the advantages of the head and base structure as described above is that by using different heads, a wide variety of types and sizes of bearings can be lubricated with the equipment. For example, with reference to FIGURE 1, it will be noted that the head 3 is threaded into the base 2 and as such it is easily and conveniently removable. Each new head has a structure similar to the head 3 and the center bore is in communication with the bore in the base 2 to form the cylindrical passage or manifold. Further the cavity 13 is configured to hold or accommodate the particular peripheral configuration of the bearing assembly, for example, a tapered bearing assembly.

During a lubricating operation, it is preferable that the bearing assembly be held in the head by mechanical means rather than by hand. For this purpose, I have provided the hold down plate 11 which is operated by the piston and cylinder device 6. A minimum of pressure is used so that the hold down plate simply engages the bearing and secures the same firmly in the cavity.

As mentioned heretofore, the flow of grease is controlled by observing the same as it exits from the top of the space between the bearing races. The hold down plate 11 is constructed to permit this observation.

For observation purposes, I have provided the hold down plate with holes which are spaced about the plate. These holes are in communication with the top of the space between the bearing races and thus, the grease exiting from the space will move upwardly through the holes. When the operator observes the grease coming through the holes, the grease source can be shut down.

The holes preferably comprise an arrangement of groups of holes with the holes in each group extending radially outwardly, for example, with reference to FIGURE 2 the groups a, b, c, d, and groups e, f, g, h. The purpose of spotting the holes in a radial fashion is to insure a grease passage for the various sizes of bearings which may be used with the equipment. For example, with small diameter bearings the grease may exit only from the inner holes a and e, whereas with a larger diameter bearing the grease may exit only from the holes d and h.

In using the device the operator actuates the controls for the cylinder device 6 so that the hold down plate moves upwardly away from the head 3. A bearing assembly is inserted in the cavity and the cylinder control is again actuated to bring the hold down plate firm against the bearing assembly. The control for the grease source is then actuated so that the grease flows into the bearing in the manner described. As the operator sees the grease coming up through the holes in the plate 11, the flow of grease is stopped. The operator then actuates the control for the cylinder 6 so that the hold down plate moves away from the bearing assembly. The bearing is then grasped in the fingers and pulled out of the cavity.

It has been my experience that bearings lubricated in the manner described will be free of excess grease. Therefore, there is no need for wiping or cleaning the bearings. The same may be put into storage or into use. Furthermore, there is no excess grease which must be wiped from the head.

The grease remains in the circular form around the groove 16. There is very little grease pulled upwardly when the bearing is extracted. I have found that even though there may be some grease sticking up in fingerlike fashion, this will not form excess grease on the equipment because when the next bearing assembly is inserted, the fingers simply stick into the space between the races.

Bearing lubrication free of excess grease is brought about by the fact that the groove 16 provides for grease to be fed directly into the space between the races from a small ring-like source. The groove structure confines and controls the grease being fed to the races and is an important feature of the invention.

The passages 24 and the manifold 23 which supply the groove 16 with grease are important parts of the invention because they are conducive to a structure which is relatively simple in form and easily manufactured. Furthermore, using a plurality of passages 24 making communication with the groove at equally spaced points provides for the controlled and uniform feed of grease to the groove and this cooperates with the groove in maintaining uniform flow of grease up into the space between the races.

Thus, the lubricating equipment described above provides a means for rapid, clean and positive lubrication of bearing assemblies. In addition to this well worthwhile advantage the invention has other advantages which will be commented on below.

The equipment described above is adaptable for lubricating several bearings at one time. For example by stacking 3 or 4 bearings one on top of the other and then closing the plate 11 on the topmost assembly, the grease will simply travel from the lower bearing in the cavity up between the races of the other bearings and then begin to exit out through the holes in the hold down plate. This type of lubricating operation still produces fully lubricated bearings free of excess grease.

Another advantage of the invention is that it finds particular utility in connection with lubricating sealed bearings. In such instances the groove 16 is disposed just below the seal and with grease pressure the seal is forced upwardly and the grease flows through the crack provided by the lifting of the seal and thence into the space between the races. When the grease begins to ooze out between the seal on the other side, the grease flow is stopped.

In lubricating sealed bearings it is preferable to use a hold down plate which engages only the inner race of the bearing so that the seal is fully exposed to the view of the operator.

Before closing I want to point out that the preferred width of the groove 16 is such that the groove itself is within the confines of the space between the inner and outer races. I have found that this structure provides the ideal condition for eliminating excess grease, both on the bearing and on the head. It has been my experience, however, that where the width of the groove is slightly wider than the space between the races, any grease which remains on the races when the bearing is pulled off is a bare minimum and in most instances does not require removal.

I claim:

1. Apparatus for lubricating bearing assemblies comprising:

a frame member;

mechanism on said frame member forming a generally flat surface including an annular groove;

means connected with said frame for engaging a bearing assembly to position said assembly on the flat surface and to present said groove only between the inner and outer races of the assembly and to hold the assembly in said position during lubrication, portions of the flat surface on opposite sides of the groove respectively engaging and supporting the sides of the inner and outer races;

means on said frame forming a grease manifold to receive grease from a source exterior to said frame; and means on said frame forming a plurality of passages extending between said manifold and said groove, the passages being adapted to conduct grease as between the manifold and the groove.

2. Apparatus for lubricating bearing assemblies comprising:

a frame comprising a base member and a head member;

means removably mounting said head member on said base member;

means on said head member forming a cavity having an upstanding flat annular wall surface and a generally flat circular bottom surface, the wall and bottom surfaces being constructed to engage and support respectively the periphery of the outer race and one side of the inner and outer races of a bearing assembly in the cavity;

means on the head member forming an annular groove semi-circular in cross section in said bottom surface, said upstanding annular wall and said groove being constructed and disposed with respect to one another to present said groove between the inner and outer races of a bearing assembly disposed in said cavity, portions of the bottom surface on opposite sides of the groove respectively engaging and supporting the sides of the inner and outer races;

means in said base and in said head forming a cylindrical passage coaxial with said annular groove and constituting a grease manifold;

a grease fitting secured to said base in communication with said manifold;

means on said head member forming a plurality of passages extending between said manifold and said groove at an acute angle to the axis of said cylindrical passage, the passages being adapted to conduct grease as between the manifold and the groove; and hold down plate means adapted to engage and securely seal the inner and outer races of the bearing assembly to the bottom surface of the cavity during a lubricating operation, and the hold down plate means being formed to allow grease to be passed through said bearing assembly from said groove whereby when grease is forced through said passages into said groove it will flow uniformly around said groove and up through said bearing assembly.

3. Apparatus for lubricating bearing assemblies comprising:
- a frame;
- means on said frame forming a cavity having an upstanding flat annular wall surface and a generally flat circular bottom surface, the wall and bottom surfaces being constructed to engage and support respectively the periphery of the outer race and one side of the inner and outer races of a bearing assembly in the cavity;
- means on the frame forming an annular groove of semicircular cross section in said bottom surface, said upstanding annular wall and said groove being constructed and disposed with respect to one another to present said groove between the inner and outer races of a bearing assembly disposed in said cavity, portions of the bottom surface on opposite sides of the groove respectively engaging and supporting the sides of the inner and outer races;
- means in said frame forming a cylindrical passage coaxial with said annular groove and constituting a grease manifold;
- a grease fitting secured to said frame in communication with said manifold;
- means on said frame forming a plurality of passages extending between said manifold and said groove at an acute angle to the axis of said cylindrical passage, the passages being adapted to conduct grease between the manifold and the groove; and
- hold down plate means adapted to engage and securely seal the inner and outer races of the bearing assembly to the bottom surface of the cavity during a lubricating operation, and the hold down plate means being formed to allow grease to be passed through said bearing assembly from said groove whereby when grease is forced through said passages into said groove it will flow uniformly around said groove and up through said bearing assembly.

References Cited

UNITED STATES PATENTS

| | | | |
|---|---|---|---|
| 2,369,178 | 2/1945 | Richmond et al. | 184—1 |
| 1,820,748 | 8/1931 | Loeffler | 184—6 |
| 2,839,160 | 6/1953 | Wright | 184—1 |

FOREIGN PATENTS

| | | |
|---|---|---|
| 906,794 | 5/1945 | France. |
| 742,730 | 1/1944 | Germany. |
| 597,766 | 2/1948 | Great Britain. |

LAVERNE D. GEIGER, *Primary Examiner.*

E. J. EARLS, *Assistant Examiner.*

UNITED STATES PATENT OFFICE
CERTIFICATE OF CORRECTION

Patent No. 3,365,024                                                   January 23, 1968

John F. Freda

It is hereby certified that error appears in the above numbered patent requiring correction and that the said Letters Patent should read as corrected below.

Column 4, line 28, strike out "to"; line 31, for "the" first occurrence, read -- said --; line 33, after "races" insert -- of the assembly --.

Signed and sealed this 15th day of April 1969.

(SEAL)
Attest:

Edward M. Fletcher, Jr.                                         EDWARD J. BRENNER
Attesting Officer                                                      Commissioner of Patents